(12) United States Patent
Wu

(10) Patent No.: US 10,045,663 B2
(45) Date of Patent: Aug. 14, 2018

(54) DOUBLE-SCREEN GRINDING MECHANISM AND DOUBLE-SCREEN GRINDING JUICER

(71) Applicant: DONGGUAN FUSHIDUO ELECTRIC CO., LTD., Dongguan, Guangdong (CN)

(72) Inventor: San Qiao Wu, Dongguan, Guangdong (CN)

(73) Assignee: Dongguan Fushiduo Electrics Co., Ltd., Dongguan, Guangdong (CN)

( * ) Notice: Subject to any disclaimer, the term of this patent is extended or adjusted under 35 U.S.C. 154(b) by 0 days.

(21) Appl. No.: 15/504,106

(22) PCT Filed: Mar. 13, 2015

(86) PCT No.: PCT/CN2015/074200
§ 371 (c)(1),
(2) Date: Feb. 15, 2017

(87) PCT Pub. No.: WO2016/074394
PCT Pub. Date: May 19, 2016

(65) Prior Publication Data
US 2017/0273509 A1    Sep. 28, 2017

(30) Foreign Application Priority Data

Nov. 13, 2014  (CN) .......................... 2014 1 0642933
Jan. 13, 2015  (CN) .......................... 2015 1 0017226
Jan. 22, 2015  (CN) .......................... 2015 1 0032572

(51) Int. Cl.
*A47J 43/07*   (2006.01)
*A47J 19/02*   (2006.01)
*A47J 43/046*  (2006.01)

(52) U.S. Cl.
CPC .......... *A47J 43/0716* (2013.01); *A47J 19/02* (2013.01); *A47J 43/046* (2013.01)

(58) Field of Classification Search
CPC ....... A47J 43/0716; A47J 43/046; A47J 19/02
(Continued)

(56) References Cited

U.S. PATENT DOCUMENTS 2,282,623 A * 5/1942 Mize ......................... A23L 2/76
                                                        366/192
2,289,612 A * 7/1942 Wells ........................ D21D 1/32
                                                        241/46.017
(Continued)

*Primary Examiner* — Eric Stapleton
(74) *Attorney, Agent, or Firm* — Muncy, Geissler, Olds & Lowe, P.C.

(57) ABSTRACT

The present invention relates to a double-screen grinding mechanism and a double-screen grinding juicer, belonging to the technical field of household appliances. The juicer comprises a motor box, a motor, a middle cover, a grinding mechanism and an upper cover, wherein the grinding mechanism consists of a filter screen and a rotor, the filter screen being of a double-layer filter screen structure and comprising an upper filter screen and a lower filter screen, the rotor comprising an upper rough-grinding portion and a lower fine-grinding portion; the motor is mounted in the motor box; the middle cover is fixed on the motor box; the filter screen is mounted within the middle cover; the rotor is located in the filter screen; the upper cover is covered on the middle cover to shield the filter screen and the rotor; and, the rotor is connected to the motor via a rotor shaft.

10 Claims, 7 Drawing Sheets

(58) Field of Classification Search
USPC .......................................................... 99/503
See application file for complete search history.

(56) References Cited

U.S. PATENT DOCUMENTS

| | | | | |
|---|---|---|---|---|
| 2,311,379 A * | 2/1943 | Gillanders | A47J 19/027 | 99/512 |
| 2,337,113 A * | 12/1943 | Knight | D21D 5/023 | 209/273 |
| 2,556,996 A * | 6/1951 | De Rocher | A47J 19/02 | 100/131 |
| 2,785,547 A * | 3/1957 | Barros | A23G 9/045 | 134/187 |
| 2,845,971 A * | 8/1958 | Cordero | A47J 19/027 | 99/512 |
| 3,165,134 A * | 1/1965 | Wayne | B02B 3/00 | 99/605 |
| 3,188,942 A * | 6/1965 | Wandel | B01D 29/118 | 100/72 |
| 3,370,626 A * | 2/1968 | Weier | A23N 1/00 | 100/110 |
| 3,382,904 A * | 5/1968 | Wayne | B02C 9/00 | 99/518 |
| 3,892,365 A * | 7/1975 | Verdun | A47J 43/06 | 241/282.1 |
| 4,166,028 A * | 8/1979 | Weber | D21D 5/026 | 209/273 |
| 4,183,293 A * | 1/1980 | Arao | A47J 19/027 | 99/512 |
| 4,203,755 A * | 5/1980 | Ruckstuhl | C05F 17/0247 | 422/164 |
| 4,240,338 A * | 12/1980 | McClean | A47J 19/02 | 241/92 |
| 4,345,517 A * | 8/1982 | Arao | A47J 19/027 | 99/511 |
| 4,506,601 A * | 3/1985 | Ramirez | A47J 19/027 | 99/511 |
| 4,614,153 A * | 9/1986 | Kurome | A47J 19/027 | 99/511 |
| 4,681,031 A * | 7/1987 | Austad | A47J 19/027 | 99/511 |
| 4,700,621 A * | 10/1987 | Eiger | A47J 19/027 | 403/24 |
| 5,143,630 A * | 9/1992 | Rolchigo | B01D 29/055 | 210/780 |
| 5,160,633 A * | 11/1992 | Hong | B01D 33/073 | 210/134 |
| 5,222,430 A * | 6/1993 | Wang | A47J 19/027 | 241/282.1 |
| 5,254,250 A * | 10/1993 | Rolchigo | B01D 35/06 | 210/321.67 |
| 5,265,347 A * | 11/1993 | Woodson | F26B 17/30 | 34/182 |
| 5,421,248 A * | 6/1995 | Hsu | A47J 19/027 | 241/282.1 |
| 5,433,144 A * | 7/1995 | Lee | A47J 19/027 | 99/511 |
| 5,479,851 A * | 1/1996 | McClean | A47J 19/027 | 210/360.1 |
| 5,569,383 A * | 10/1996 | Vander Ark, Jr. | B01D 29/6476 | 209/273 |
| 5,636,923 A * | 6/1997 | Nejat-Bina | B01F 7/00908 | 241/74 |
| 5,662,032 A * | 9/1997 | Baratta | A47J 43/046 | 210/380.1 |
| 5,690,021 A * | 11/1997 | Grey | A23N 1/00 | 366/205 |
| 5,707,517 A * | 1/1998 | Rolchigo | B01D 29/055 | 210/232 |
| 5,882,246 A * | 3/1999 | Inkyo | B02C 17/16 | 241/171 |
| 6,065,861 A * | 5/2000 | Chen | A47J 27/004 | 241/69 |
| 6,135,019 A * | 10/2000 | Chou | A23N 1/00 | 366/205 |
| 6,223,652 B1 * | 5/2001 | Calia | A47J 19/027 | 241/73 |
| 6,406,214 B1 * | 6/2002 | Chene | A45C 13/10 | 206/308.1 |
| 6,817,750 B1 * | 11/2004 | Sands | A47J 19/027 | 366/205 |
| 7,063,009 B2 * | 6/2006 | Lin | A47J 43/0766 | 366/314 |
| 7,238,921 B2 * | 7/2007 | Beesley | A47J 27/04 | 219/386 |
| 7,263,926 B2 * | 9/2007 | Chang Chien | A47J 43/0727 | 99/348 |
| 7,275,666 B2 * | 10/2007 | Rukavina | A23G 9/045 | 220/731 |
| 7,278,779 B2 * | 10/2007 | Beesley | A47J 43/06 | 366/192 |
| 7,422,361 B2 * | 9/2008 | Pryor, Jr. | A47J 43/046 | 366/197 |
| 7,422,362 B2 * | 9/2008 | Sands | A47J 43/0716 | 366/205 |
| 7,430,957 B2 * | 10/2008 | Sands | A47J 19/027 | 366/205 |
| 7,441,944 B2 * | 10/2008 | Sands | A47J 43/046 | 366/205 |
| 7,520,659 B2 * | 4/2009 | Wulf | A47J 43/042 | 366/198 |
| 7,673,824 B2 * | 3/2010 | Stamper, III | A47J 43/046 | 241/282.2 |
| 7,866,259 B2 * | 1/2011 | Zaghloul | A47J 37/1271 | 210/360.1 |
| 7,878,701 B2 * | 2/2011 | Stephens | A47J 27/004 | 366/145 |
| 8,387,520 B2 * | 3/2013 | Backus | A47J 19/027 | 99/512 |
| 8,752,480 B1 * | 6/2014 | DeJong | A23L 2/02 | 100/111 |
| 9,016,196 B2 * | 4/2015 | Hensel | A47J 37/0835 | 241/37.5 |
| 9,149,810 B2 * | 10/2015 | Jagle | B02C 18/12 | |
| 9,220,373 B2 * | 12/2015 | Hensel | A47J 19/02 | |
| 9,700,177 B2 * | 7/2017 | Roberts | A47J 43/0716 | |
| 2002/0062576 A1 * | 5/2002 | Sandford | F26B 5/08 | 34/168 |

\* cited by examiner

DOUBLE-SCREEN GRINDING MECHANISM AND DOUBLE-SCREEN GRINDING JUICER

FIELD OF THE INVENTION

The present invention relates to the technical field of household appliances, and in particular to a double-screen grinding mechanism and a double-screen grinding juicer, which are able to juice fruits, vegetables and the like.

BACKGROUND OF THE INVENTION

As one of machines for mechanically juicing fruits or vegetables, juicers have been widely used for a long period of time. However, a conventional centrifugal juicer will oxidize enzymes in fruits and vegetables, and the produced juice is unsatisfactory in color and taste, so the conventional centrifugal juicer has been unable to meet people's requirements for the high-quality life. By juicing fruits and vegetables in a slow grinding manner, a slow grinding juicer may completely reserve enzymes and result in juice with natural color and delicate taste. The slow grinding juicer has been developed steadily.

However, slow grinding juicers in the current market have a single structure in terms of filter screens. A conventional filter screen is of a single-layer structure and unable to have both grinding and cutting functions, and a wall cutter on an inner wall and a rotor have a poor cooperative grinding effect and an unreasonable structure. Consequently, fruit or vegetable raw materials, when being processed, are likely to slide to the bottom of the filter screen, the juicing effect will be reduced due to an insufficient grinding force, and the obtained juice basically contains no dietary fiber. Furthermore, the conventional rotor, spiral ribs on the surface of the rotor and the wall cutter on the inner wall of the filter screen are made of plastics, and are easy to wear after long-term use, so that the grinding effect will be reduced and it is disadvantageous for food safety.

In addition, the on/off of the conventional juicer is controlled by a single control button, and the control button is provided on a side face of a machine base, which is easy to touch. Thus, when the switch is touched by accident, particularly by children, the rotor starts rotating without consciousness, so that it is very likely to cause accidents. In addition, in order to increase the capacity and use convenience of juicers, at present, majority of juicers are designed as a large-aperture structure, and the large-aperture juicers are sufficient to accommodate an adult's hand. However, since the height of an upper cover of a large-aperture juicer is insufficient, when the machine is rotating, there are safety risks if a person has his/her hands into this juicer.

SUMMARY OF THE INVENTION

A first technical problem to be solved by the present invention is to provide a double-screen grinding mechanism, which is applied to a juicer, and makes the juicer have a higher yield and can effectively protect nutrients.

To solve the first technical problem, the present invention employs the following technical solutions.

The present invention provides a double-screen grinding mechanism, including a filer screen with an opening on its top and a rotor located inside the filter screen, wherein the filter screen is of a double-layer filter screen structure and includes an upper filter screen and a lower filter screen, an inner diameter of the lower filter screen being smaller than that of the upper filter screen, the upper filter screen and the lower filter screen being connected and transited by a filter screen grinding surface. An upper wall cutter is provided on an inside wall of the upper filter screen, a lower wall cutter is provided an inside wall of the lower filter screen, and a middle wall cutter is provided on an inside wall of the filter screen grinding surface. Filter holes are uniformly formed on walls of the upper filter screen and the lower filter screen.

The rotor includes an upper rough-grinding portion and a lower fine-grinding portion. A spiral cutting rib is provided on a surface of the rough-grinding portion, and spiral grinding ribs are provided on a surface of the fine-grinding portion. The rough-grinding portion and the fine-grinding portion are connected and transited by a rotor grinding surface. A convex cutter is provided on a surface of the rotor grinding surface. Wherein, the rough-grinding portion corresponds to the upper filter screen; the fine-grinding portion corresponds to the lower filter screen; the rotor grinding surface corresponds to the filter screen grinding surface; and a gap for grinding is reserved between the rotor grinding surface and the filter screen grinding surface.

In the above description, as a preferred solution, both the filter screen grinding surface and the rotor grinding surface are parallel to a horizontal plane.

In the above description, as a preferred solution, both the filter screen grinding surface and the rotor grinding surface are inclined downward.

In the above description, as a preferred solution, an aperture of each of the upper filter screen and the lower filter screen becomes smaller gradually from upper to lower, and each of the upper wall cutter and the lower wall cutter correspondingly is of a structure that becomes thinner gradually from upper to lower.

In the above description, as a preferred solution, the rough-grinding portion of the rotor is of a conical structure with a thick upper portion and a thin lower portion; the spiral cutting rib is correspondingly of a structure with a wide upper portion and a narrow lower portion; and, the spiral grinding ribs are arranged obliquely or vertically, and the spiral grinding ribs are independent of each other.

In the above description, as a preferred embodiment, all the upper wall cutter, the lower wall cutter and the middle wall cutter are made of a stainless steel material, and are arranged obliquely or vertically; all the rotor, the spiral cutting rib, the spiral grinding ribs and the convex cutter are made of a stainless steel material, and all the spiral cutting rib, the spiral grinding ribs and the convex cutter are arranged obliquely or vertically, wherein the upper wall cutter and the spiral cutting rib have a same direction of inclination, the lower wall cutter and the spiral grinding ribs have a same direction of inclination, and the middle wall cutter and the convex cutter have opposite directions of inclination. The rotor made of stainless steel is more advantageous for food safety and is difficult to wear.

The present invention uses a stainless material as a cutting material. Compared with the conventional plastic material, the stainless steel material is difficult to wear, and will not produce any chemical reactions after long-term use, so that the food safety is ensured and the cutting force is stronger.

The upper wall cutter and the spiral cutting rib have a same direction of inclination, the middle wall cutter and the convex cutter form a staggered structure, and the lower wall cutter and the spiral grinding ribs have a same direction of inclination. When the rotor is rotating, the spiral cutting rib, the convex cutter and the spiral grinding ribs operate approximately to the upper wall cutter, the middle wall cutter and the lower wall cutter, respectively. Fruit residues are grinded more effectively between the upper wall cuter and the spiral cutting rib, between the middle wall cutter and the convex cutter and between the lower wall cutter and the spiral grinding ribs.

In the above description, as a preferred solution, the filter holes are of a D-shaped structure arranged longitudinally, i.e., D-shaped holes. In addition, the filter holes in the present invention may also be designed as a B-shaped structure. When the machine operates, residues will be blocked at an arc portion of the D-shaped holes, but are difficult to be blocked on one end of a vertical portion, so the juice yield may be improved. In addition, when washing, the machine may be easily cleaned in a direction from the arc portion to the vertical portion. Each of the filter holes in the present invention is in a trumpet-shape having a smaller interior and a larger exterior. Such a structure may produce a cutting force at an end with a smaller aperture, so the blockage of residues to the filter holes will be relieved.

The double-screen grinding mechanism provided by the present invention has the following beneficial effects: by designing the filter and the rotor as upper and lower portion structures corresponding to each other and making each portion correspond to a corresponding cutting and grinding mechanism for its particular structural design, and by additionally providing a grinding structure for the purpose of double squeezing and applying a staggered form to the filter screen and the rotor grinding surface, a large force is imposed on fruit residues in the grinding structure, the squeezing effect is obvious, the juicing speed is fast, and the juice yield is high; moreover, the fiber content is greatly increased, and a more significant juicing effect particularly on raw materials with hard shells, such as beans, is achieved. In addition, the rotor made of stainless steel is more advantageous for food safety and difficult to wear.

A second technical problem to be solved by the present invention is to provide a double-screen grinding juicer, which has a more rational structural design and a higher yield in use, and may effectively protect nutrients in food.

To solve the second technical problem, the present invention employs the following technical solutions.

The present invention provides a double-screen grinding juicer, including a motor box, a motor, a middle cover, a grinding mechanism and an upper cover, wherein the grinding mechanism consists of a filter screen and a rotor; the motor is mounted in the motor box; the middle cover is fixed on the motor box; the filter screen is mounted within the middle cover; the rotor is located in the filter screen; the upper cover is covered on the middle cover to shield the filter screen and the rotor; a residue discharge pipe is provided on a side of the middle cover, and the residue discharge pipe is butt-jointed to a fruit residue cup; and, the rotor is connected to the motor via a rotor shaft.

In the above description, as a preferred embodiment, the top of the upper cover is a large-aperture feed inlet, a pressing rod capable of being inserted and taken out and used for pressing down material being provided within the large-aperture feed inlet; a touch switch for enabling the machine to operate normally is provided within the motor box, the touch switch being fixed by a switch pressing plate; a slider assembly for actively touching the touch switch to turn on or off the touch switch is provided on an outer surface of the upper cover, and an elastic assembly for restoring the slider assembly is further provided on the slider assembly; after the slider assembly is restored, the touch switch is also restored and turned off; and, a guide strip for triggering the slider assembly to move is vertically provided on an outer surface of the pressing rod.

In the above description, as a preferred embodiment, the slider assembly includes a slider, a touch rod A, a connecting rod, a horizontal slide plate and a touch rod B. The slider is movably and transversely provided at an upper end of the outer surface of the upper cover, the touch rod A is movably and vertically provided in the middle of the outer surface of the upper cover, and the connecting rod and the horizontal slide plate are movably provided at a lower end of the outer surface of the upper cover. One end of the slider comes into contact with the bottom of the guide strip of the pressing rod. When the pressing rod is pressed down, one end of the slider slides to a side of the guide strip and comes into contact with the side of the guide strip, while the other end of the slider comes into contact with the top of the touch rod A. two ends of the connecting rod are movably hinged with the bottom of the touch rod A and one end of the horizontal slide plate, respectively. The other end of the horizontal slide plate comes into contact with the top of the touch rod B, and the bottom of the touch rod B comes into contact with the touch switch. When the pressing rod is inserted, the guide strip triggers the slider to slide, and the slider squeezes the touch rod A while sliding, so that the touch rod A moves downward. Meanwhile, one end of the connecting rod connected to the touch rod A moves downward, while the other end thereof moves horizontally. The other end of the connecting rod that moves horizontally makes the horizontal slide plate synchronously move horizontally to squeeze the touch rod B. Thus, the touch rod B vertically moves downward, and finally comes into contact with the touch switch, so that the touch switch is closed and the juicer operates normally. On the contrary, due to the action of the elastic assembly, the slider, the touch rod A and the touch rod B are restored, so that the touch switch is turned off and the juicer stops operating.

In the above description, as a more preferred solution, the elastic assembly comprises a tension spring, a spring A and a spring B. The tension spring is used for restoring the slider. One end of the tension spring is fixed at the upper end of the outer surface of the upper cover, while the other end thereof is fixed at the other end of the slider. The spring A is used for restoring the touch rod A. The spring A is sheathed on the touch rod A. The upper end of the spring A resists against the touch rod A, while the lower end thereof resists against the upper cover. The spring B is used for restoring the touch rod B. The spring B is sheathed on the touch rod B. An auxiliary cover plate with a through hole is sheathed on the top of the touch switch. The upper end of the spring B resists against the touch rod B, while the lower end thereof resists against the auxiliary cover plate. The bottom of the touch rod may pass through the through hole of the auxiliary cover plate, so as to come into contact with the touch switch. When restoring, the pressing rod is taken out, and the tension spring, the spring A and the spring B are restored simultaneously, so that the slider, the touch rod A and the touch rod B are restored correspondingly. The touch rod A and the touch rod B move upward, the horizontal slide plate is separated from the touch rod B, and the touch rod B moves away from the touch switch, so that the touch switch is turned off and the juicer stops operating.

Since the juicer with a large-aperture upper cover has safety risks, a touch switch is additionally provided for safe startup. By inserting the pressing rod, the slider assembly is touched to make the touch switch closed, so the machine is activated safely. When the pressing rod is taken out, the machine stops operating. In other words, the juicer may be activated only by inserting the pressing rod. Thus, the hazard caused by having a hand into the large-aperture juicer when the pressing rod is not inserted is avoided, and the absolute usage safety of the large-aperture juicer is ensured in its structure.

In the above description, as a preferred solution, a rotatable filter screen brush is provided between the filter screen and the middle cover, and an inner side face of the filter screen brush comes into contact with an outer side face of the filter screen. The filter screen brush may be rotated about the filter screen to remove thick juice liquid and fine fibers penetrating through the filter holes in a rotating manner, so as to maintain the smoothness of the filer holes.

In the above description, as a preferred solution, support arms are provided on two sides of the middle cover, and the upper cover and the grinding mechanism are erected on the two support arms. Compared with the conventional single-arm structure, the double-arm structure using two support arms may improve the operation stability of the machine.

In the above description, as a preferred solution, on the top of the rotor shaft, a cutter shaft is exposed above the rotor; a motor shaft sleeve is fixed on the cutter shaft; a cutter is fixed on the motor shaft; and the cutter is located inside the upper cover.

When the juicer provided by the present invention operates, the filter screen is immovable, but the rotor rotates with the motor. The upper end of the rotor may play a role of cutting fruits. The cut fruits move downward along the spiral cutting rid, and are squeezed by the rotor and the filter screen during movement. The gap between the rotor and the filter screen becomes smaller gradually from upper to lower. A force imposed on the fruit residues in a direction vertical to the filter screen direction is maximal. The grinding structure is of a staggered structure, and the convex cutter passes by the middle cutter closely, so the squeezing force on the fruit residues is increased, and the squeezing effect is enhanced. Meanwhile, it may also be ensured that the fruit residues move downward along the ribs. When reaching the lower filter screen, the fruit residues are squeezed again. Juice in the fruit residues is basically squeezed out when the fruit residues reach the bottom. The remaining fruit residues fall into the fruit residue cup from the residue discharge pipe.

The juicer provided by the present invention has the following beneficial effects: by designing a juicer with a double-screen grinding mechanism, compared with the conventional structure, the juicer has a large force imposed on fruit residues in the double-screen grinding mechanism, a fast juicing speed and a high yield; moreover, the juicer improves the fiber content, and particularly has a more significant juicing effect on raw materials with hard shells, such as beans.

in which: 1: motor box; 2: fruit residue cup; 3: motor; 4: middle cover; 5: residue discharge pipe; 6: filter screen brush; 7: filter screen; 8: rotor; 9: upper cover; 10: motor shaft sleeve; 11: rotor grinding surface; 12: rotor shaft; 13: cutter; 14: rough-grinding portion; 15: fine-grinding portion; 16: filter screen surface; 17: spiral cutting rib; 18: spiral grinding rib; 19: cutter shaft; 20: convex cutter; 21: upper filter screen; 22: lower filter screen; 23: filter hole; 24: upper wall cutter; 25: lower wall cutter; 26: middle wall cutter; 27: pressing rod; 28: touch switch; 29: slider assembly; and, 30: elastic assembly.

DETAILED DESCRIPTION OF THE PREFERRED EMBODIMENTS

The present invention will be further described in detail with reference to the accompanying drawings by specific implementations.

Embodiment 1

Figure 1:
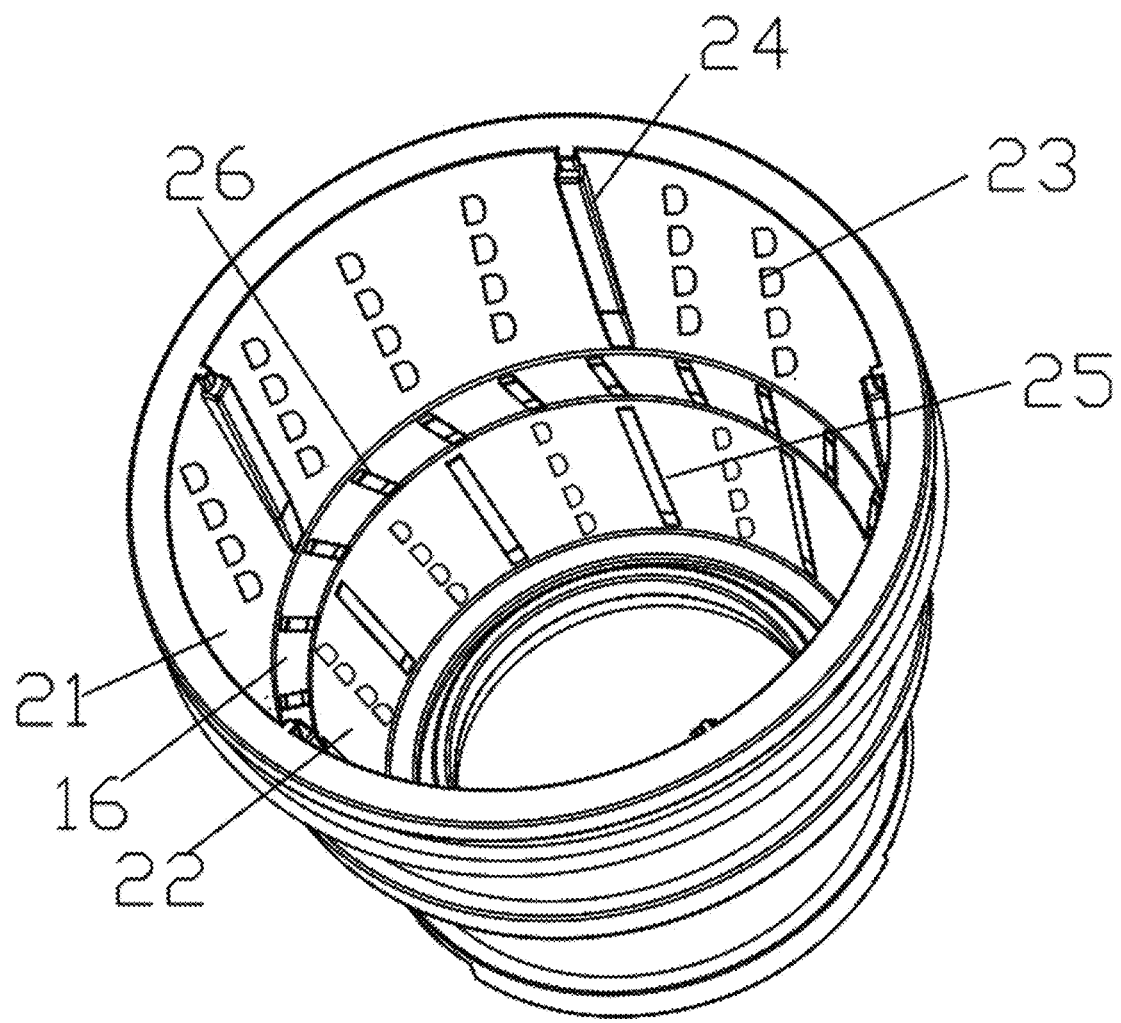
FIG. 1 is a stereoscopically structural diagram of a filter screen of a double screen grinding mechanism according to Embodiment 1 of the present invention.

Referring to FIGS. 1 to 6, the double-screen grinding mechanism provided by this embodiment includes a filter screen 7 with an opening on its top and a rotor 8 located inside the filter screen 7. The filter screen 7 is of a double-layer filter screen structure, as shown in FIG. 1, and includes an upper filter screen 21 and a lower filter screen 22. An inner diameter of the lower filter screen 22 is smaller than that of the upper filter screen 21. The upper filter screen 21 and the lower filter screen 22 are connected and transited by a filter screen grinding surface 16. The filter screen grinding surface 16 in this embodiment is parallel to the horizontal plane. In order to ensure the grinding effect, an upper wall cutter 24 is provided on an inside wall of the upper filter screen 21, a lower wall cutter 25 is provided an inside wall of the lower filter screen 22, and a middle wall cutter 26 is provided on an inside wall of the filter screen grinding surface 16; and, filter holes 23 are uniformly formed on walls of both the upper filter screen 21 and the lower filter screen 22. The filter holes 23 in this embodiment are of a D-shaped structure arranged longitudinally, and each of the filter holes 23 is in a trumpet shape having a smaller interior and a larger exterior.

In addition, in this embodiment, an aperture of each of the upper filter screen 21 and the lower filter screen 22 becomes smaller gradually from upper to lower, and each of the upper wall cutter 24 and the lower wall cutter 25 correspondingly is of a structure that becomes thinner gradually from upper to lower. Moreover, all the upper wall cutter 24, the lower wall cutter 25 and the middle wall cutter 26 are made of a stainless steel material, the upper wall cutter 24 and the lower wall cutter 25 are arranged vertically, and the middle wall cutter 26 is arranged obliquely.

Figure 2:
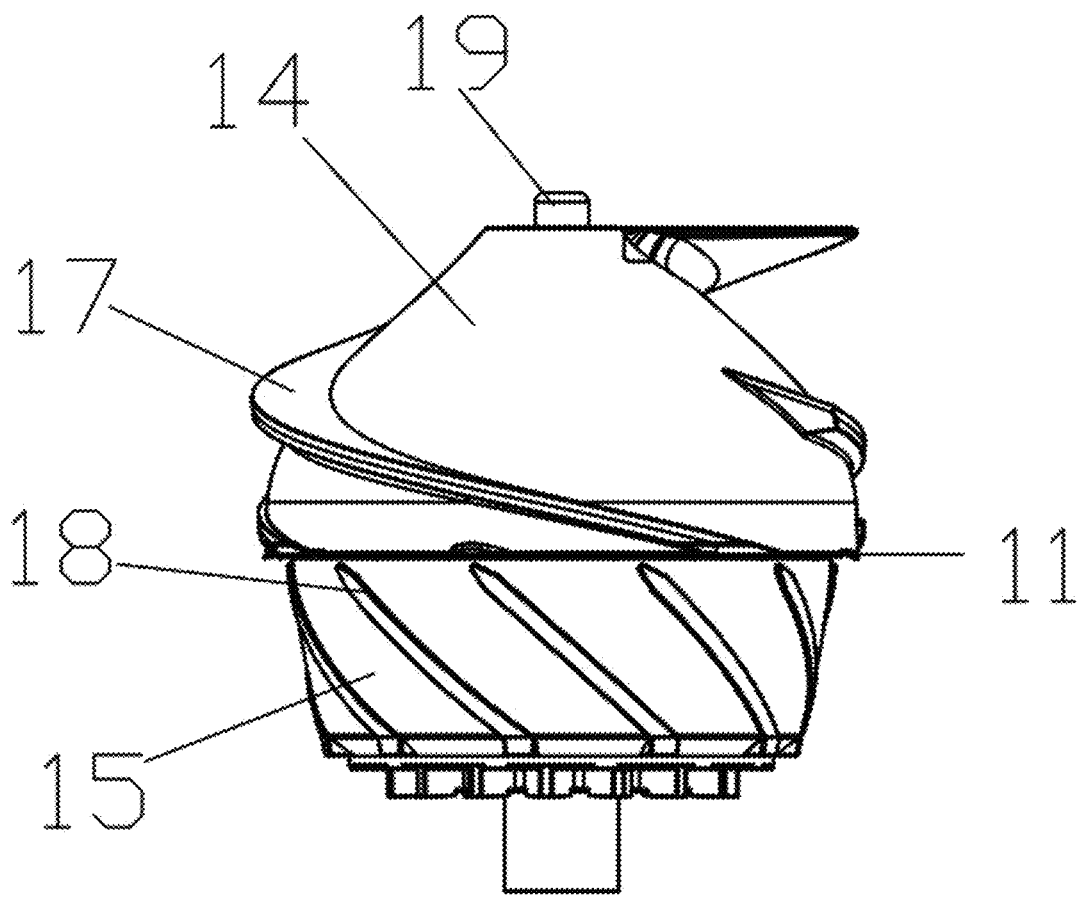
FIG. 2 is a main view of a rotor of the double-screen grinding mechanism according to Embodiment 1 of the present invention.

As shown in FIG. 2, the rotor 8 includes an upper rough-grinding portion 14 and a lower fine-grinding portion 15. A spiral cutting rib 17 is provided on a surface of the rough-grinding portion 14, and spiral grinding ribs 18 are provided on a surface of the fine-grinding portion 15. The rough-grinding portion 14 and the fine-grinding portion 15 are connected and transited by a rotor grinding surface 11. A convex cutter 20 is provided on a surface of the rotor grinding surface 11. Wherein, the rough-grinding portion 14 corresponds to the upper filter screen 21, the fine-grinding portion 15 corresponds to the lower filter screen 22, the rotor grinding surface 11 corresponds to the filter screen grinding surface 16, and a gap for grinding is reserved between the rotor grinding surface 11 and the filter screen grinding surface 16. In this embodiment, the rotor grinding surface 11 is also parallel to the horizontal plane, and the rotor grinding surface 11 and the filter screen grinding surface 16 form a grinding structure. The rough-grinding portion 14 of the rotor 8 is of a conical structure with a thick upper portion and a thin lower portion; the spiral cutting rib 17 is correspondingly of a structure with a wide upper portion and a narrow lower portion; and, the spiral grinding ribs are arranged obliquely, and the spiral grinding ribs 18 are independent of each other. All the rotor 8, the spiral cutting rib 17, the spiral grinding ribs 18 and the convex cutter 20 are made of a stainless steel material, and all the spiral cutting rib 17, the spiral grinding ribs 18 and the convex cutter 20 are arranged obliquely, wherein the upper wall cutter 24 and the spiral cutting rib 17 have a same direction of inclination, the lower wall cutter 25 and the spiral grinding ribs 18 have a same direction of inclination, and the middle wall cutter 26 and the convex cutter 20 have opposite directions of inclination.

Figure 3:
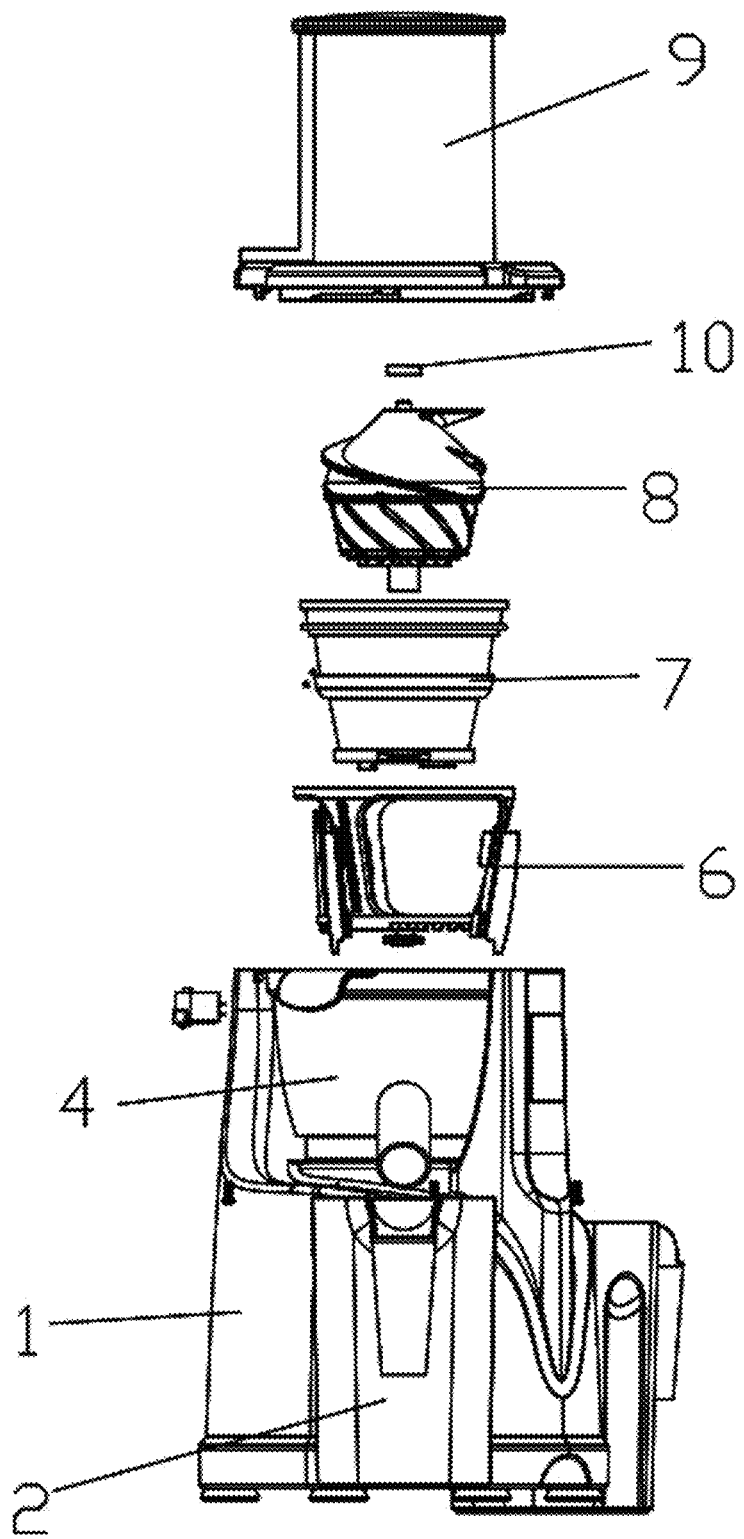
FIG. 3 is a planar structure decomposition diagram of a double-screen grinding juicer according to Embodiment 1 of the present invention.
Figure 4:
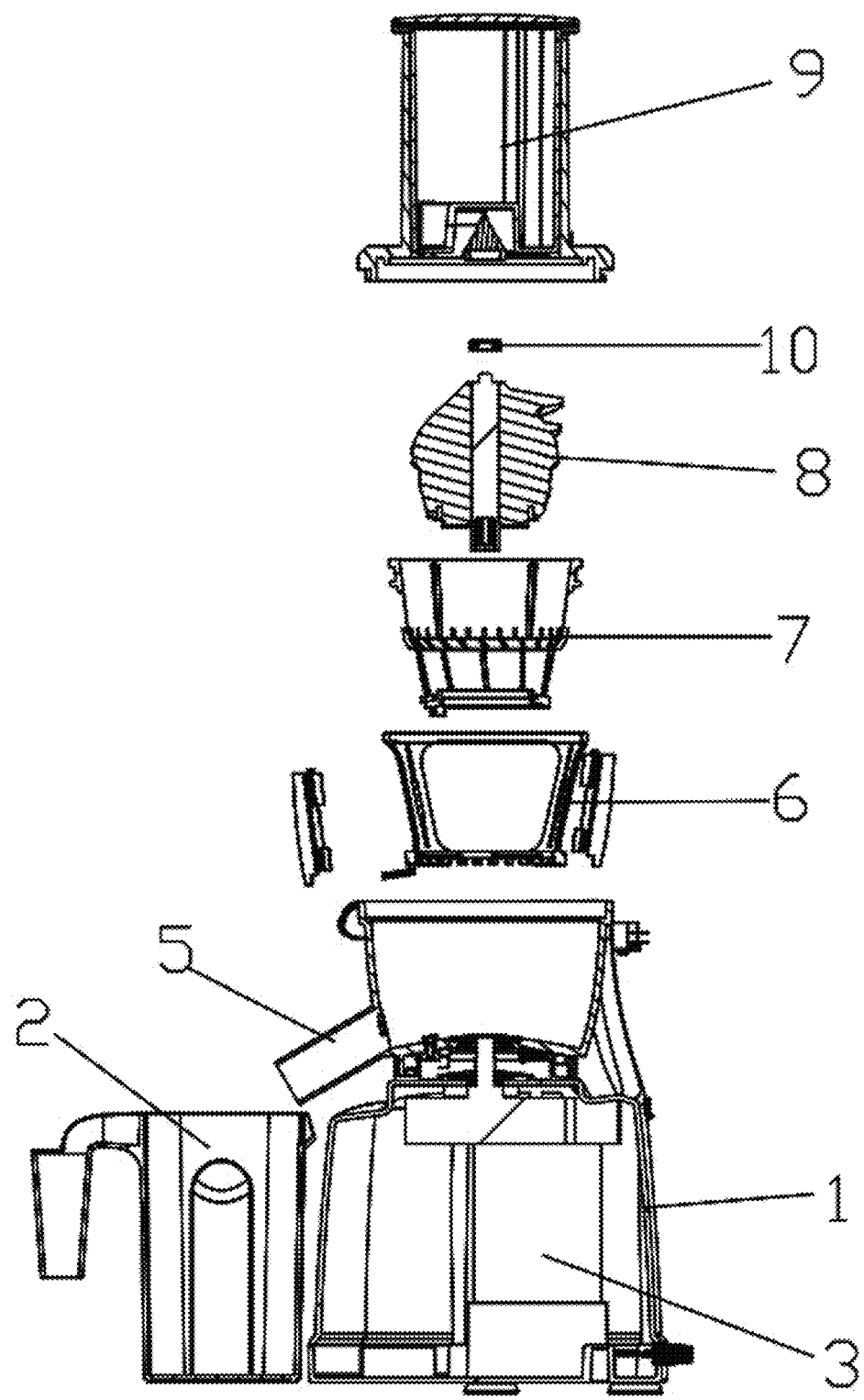
FIG. 4 is a front sectional structure decomposition diagram of the double-screen grinding juicer according to Embodiment 1 of the present invention.
Figure 5:
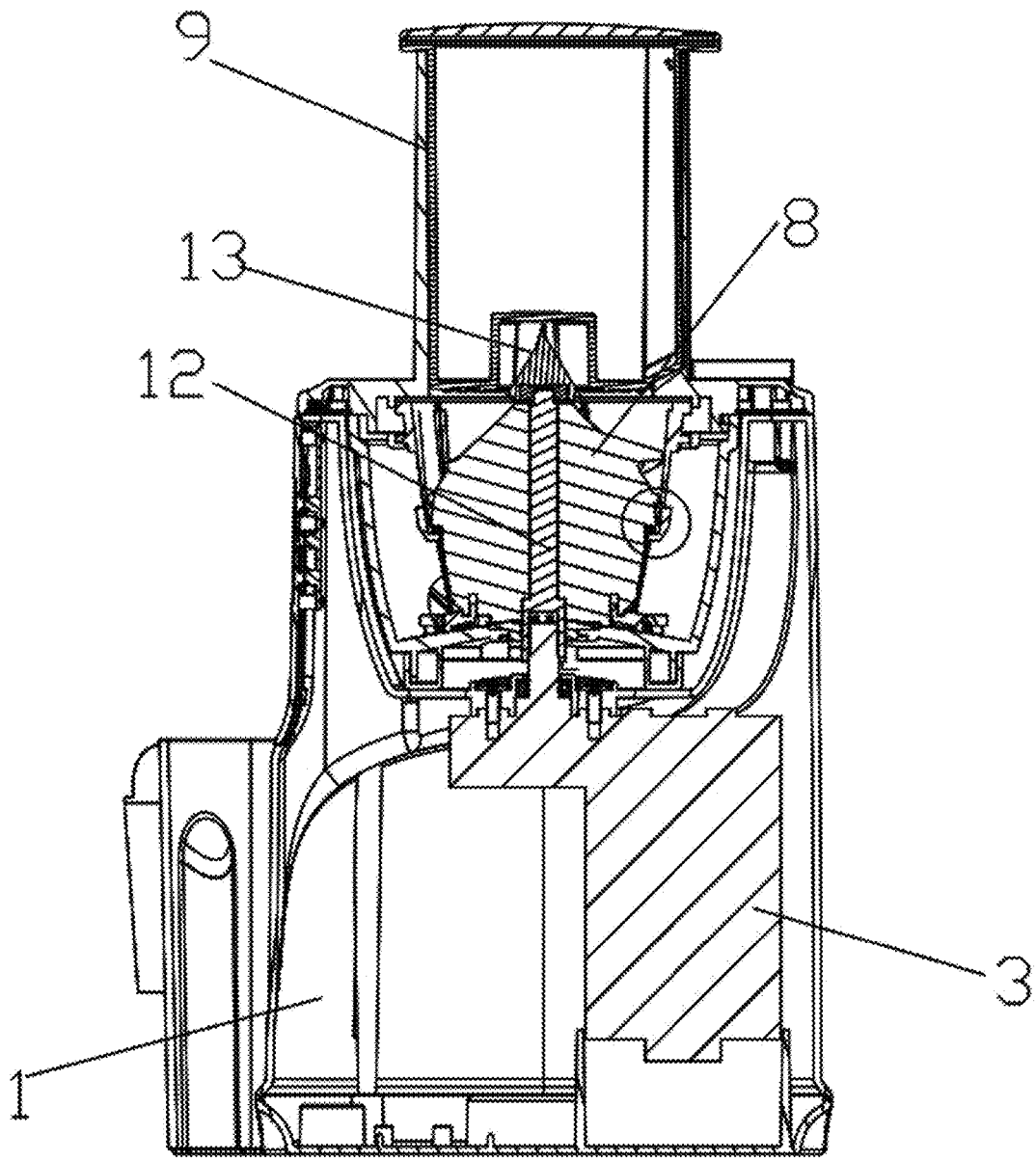
FIG. 5 is a sectional view of an assembled state of the double-screen grinding juicer according to Embodiment 1 of the present invention.
Figure 6:
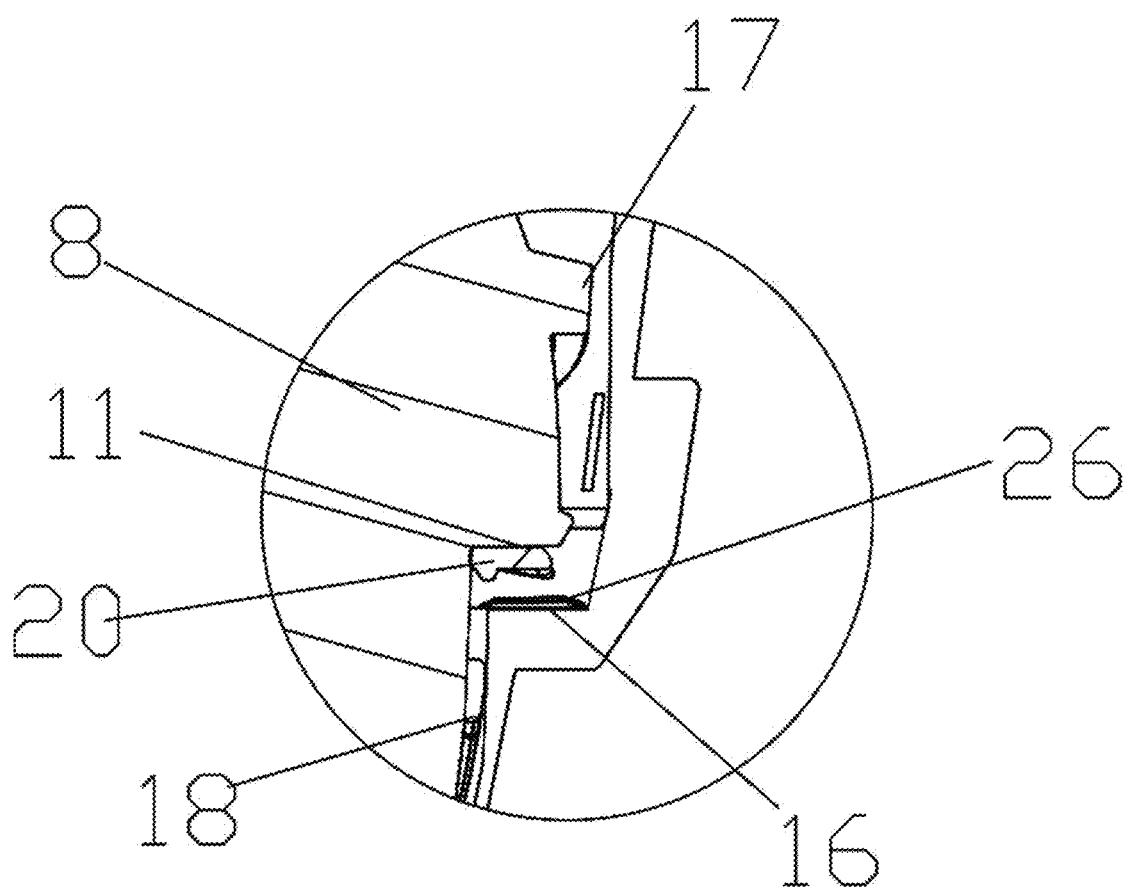
FIG. 6 is a partial enlarged view of FIG. 5.

As shown in FIGS. 3 and 4, the double-screen grinding juicer provided by Embodiment 1 includes a motor box 1, a motor 3, a middle cover 4, a grinding mechanism and an upper cover 9. The grinding mechanism consists of a filter screen and a rotor. The specific structure of the filter screen is shown in FIG. 1, and the specific structure of the rotor is shown in FIG. 2. The filter screen includes a filter screen grinding surface 16, and the rotor includes a rotor grinding surface 11. The filter screen grinding surface 16 and the rotor grinding surface 11 form a grinding structure. As shown in FIGS. 5 and 6, the grinding structure in this embodiment is parallel to the horizontal plane. The motor 3 is mounted in the motor box 1. The middle cover 4 is fixed on the motor box 1. The filter screen is mounted within the middle cover 4. The rotor is located in the filter screen. A rotatable filter screen brush 6 is provided between the filter screen and the middle cover 4. The upper cover 9 is covered on the middle cover 4 to shield the filter screen and the rotor. A residue discharge pipe 5 is provided on a side of the middle cover 4, and the residue discharge pipe 5 is butt-jointed to a fruit residue cup 2. The rotor is connected to the motor 3 via a rotor shaft 12. On the top of the rotor shaft 12, a cutter shaft 19 is exposed above the rotor. A motor shaft sleeve 10 is fixed on the cutter shaft 19. A cutter 13 is fixed on the motor shaft 10. The cutter 13 is located inside the upper cover 9.

Embodiment 2

Figure 7:
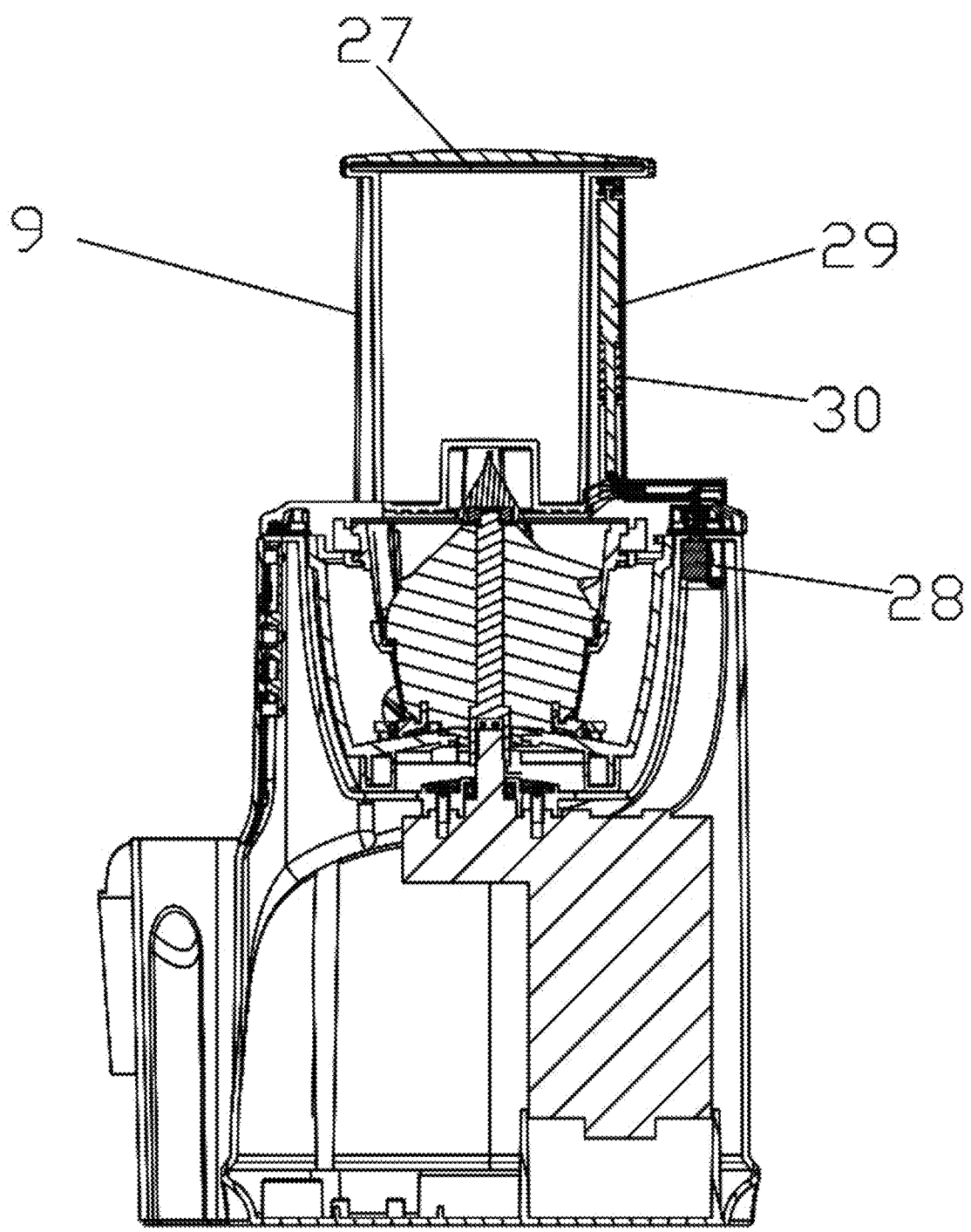
FIG. 7 is a sectional view of an assembled state of a double-screen grinding juicer according to Embodiment 2 of the present invention.

Referring to FIG. 7, differences between Embodiment 2 and Embodiment 1 lie in that: the top of the upper cover 9 is a large-aperture feed inlet, a pressing rod 27 capable of being inserted and taken out and used for pressing down material being provided within the large-aperture feed inlet; a touch switch 28 for enabling the machine to operate normally is provided within the motor box 1, the touch switch 28 being fixed by a switch pressing plate; a slider assembly 29 for actively touching the touch switch 28 to turn on or off the touch switch 28 is provided on an outer surface of the upper cover 9, and an elastic assembly 30 for restoring the slider assembly 29 is further provided on the slider assembly 29; after the slider assembly 29 is restored, the touch switch 28 is also restored and turned off; and, a guide strip for triggering the slider assembly 29 to move is vertically provided on an outer surface of the pressing rod 27. Since the juicer with a large-aperture upper cover 9 has safety risks, a touch switch 28 is additionally provided for safe startup. By inserting the pressing rod 27, the slider assembly 29 is touched to make the touch switch 28 closed, so the machine is activated safely. When the pressing rod 27 is taken out, the machine stops operating. In other words, the juicer may be activated only by inserting the pressing rod 27. Thus, the hazard caused by having a hand into the large-aperture juicer when the pressing rod 27 is not inserted is avoided, and the absolute usage safety of the large-aperture juicer is ensured in its structure.

The forgoing contents merely show the further detailed description of the present invention with reference to the specific preferred embodiments, but the specific implementations of the present invention should not be deemed as being limited thereto. A person of ordinary skill in the art may make some simple deductions or replacements without departing from the idea of the present invention, and all the simple deductions or replacements shall fall into the protection scope of the present invention.

What is claimed is:

1. A double-screen grinding mechanism, comprising a filter screen with an opening on its top and a rotor located inside the filter screen, wherein the filter screen is of a double-layer filter screen structure and comprises an upper filter screen and a lower filter screen, an inner diameter of the lower filter screen being smaller than that of the upper filter screen, the upper filter screen and the lower filter screen being connected and transited by a filter screen grinding surface, an upper wall cutter being provided on an inside wall of the upper filter screen, a lower wall cutter being provided an inside wall of the lower filter screen, a middle wall cutter being provided on an inside wall of the filter screen grinding surface, filter holes being uniformly formed on walls of the upper filter screen and the lower filter screen; the rotor comprises an upper rough-grinding portion and a lower fine-grinding portion, a spiral cutting rib being provided on a surface of the rough-grinding portion, spiral grinding ribs being provided on a surface of the fine-grinding portion, the rough-grinding portion and the fine-grinding portion being connected and transited by a rotor grinding surface, a convex cutter being provided on a surface of the rotor grinding surface, wherein the rough-grinding portion corresponds to the upper filter screen; the fine-grinding portion corresponds to the lower filter screen; the rotor grinding surface corresponds to the filter screen grinding surface; and a gap for grinding is reserved between the rotor grinding surface and the filter screen grinding surface.

2. The double-screen grinding mechanism according to claim 1, wherein both the filter screen grinding surface and the rotor grinding surface are parallel to a horizontal plane.

3. The double-screen grinding mechanism according to claim 1, wherein both the filter screen grinding surface and the rotor grinding surface are inclined downward.

4. The double-screen grinding mechanism according to claim 1, wherein an aperture of each of the upper filter screen and the lower filter screen becomes smaller gradually from upper to lower, and each of the upper wall cutter and the lower wall cutter correspondingly is of a structure that becomes thinner gradually from upper to lower.

5. The double-screen grinding mechanism according to claim 4, wherein the rough-grinding portion of the rotor is of a conical structure with a thick upper portion and a thin lower portion; the spiral cutting rib is correspondingly of a structure with a wide upper portion and a narrow lower portion; and, the spiral grinding ribs are arranged obliquely or vertically, and the spiral grinding ribs are independent of each other.

6. The double-screen grinding mechanism according to claim 1, wherein all the upper wall cutter, the lower wall cutter and the middle wall cutter are made of a stainless steel material, and are arranged obliquely or vertically; all the rotor, the spiral cutting rib, the spiral grinding ribs and the convex cutter are made of a stainless steel material, and all the spiral cutting rib, the spiral grinding ribs and the convex cutter are arranged obliquely or vertically, wherein the upper wall cutter and the spiral cutting rib have a same direction of inclination, the lower wall cutter and the spiral grinding ribs have a same direction of inclination, and the middle wall cutter and the convex cutter have opposite directions of inclination.

7. The double-screen grinding mechanism according to claim 1, wherein the filter holes are of a D-shaped structure arranged longitudinally, and each of the filter holes is in a trumpet-shape having a smaller interior and a larger exterior.

8. A double-screen grinding juicer, wherein the juicer comprises a motor box, a motor, a middle cover, an upper cover and the grinding mechanism of claim 1; the grinding mechanism consists of a filter screen and a rotor; the motor is mounted in the motor box; the middle cover is fixed on the motor box; the filter screen is mounted within the middle cover; the rotor is located in the filter screen; the upper cover is covered on the middle cover to shield the filter screen and the rotor; and, the rotor is connected to the motor via a rotor shaft.

9. The double-screen grinding juicer according to claim 8, wherein the top of the upper cover is a large-aperture feed inlet, a pressing rod capable of being inserted and taken out and used for pressing down material being provided within the large-aperture feed inlet; a touch switch for enabling the machine to operate normally is provided within the motor box, the touch switch being fixed by a switch pressing plate; a slider assembly for actively touching the touch switch to turn on or off the touch switch is provided on an outer surface of the upper cover, and an elastic assembly for restoring the slider assembly is further provided on the slider assembly; after the slider assembly is restored, the touch switch is also restored and turned off; and, a guide strip for triggering the slider assembly to move is vertically provided on an outer surface of the pressing rod.

10. The double-screen grinding juicer according to claim 8, wherein a rotatable filter screen brush is provided between the filter screen and the middle cover, and an inner side face of the filter screen brush comes into contact with an outer side face of the filter screen.

* * * * *